United States Patent [19]

Basting et al.

[11] 3,757,246

[45] Sept. 4, 1973

[54] ENERGY STORER AND DISCHARGE CHAMBER FOR A GAS LASER DEVICE

[75] Inventors: Dirk Basting, Am Weissen Stein; Fritz Peter Schafer; Bernhard Steyer, both of Gottingen-Nikolausberg, all of Germany

[73] Assignee: Carl-Zeiss-Stiftung dba Carl Zeiss, Heidenheim on the Brenz, Wuerttemberg, Germany

[22] Filed: July 12, 1972

[21] Appl. No.: 271,137

[30] Foreign Application Priority Data
July 14, 1971 Germany............... P 21 35 109.7

[52] U.S. Cl.............................. 331/94.5, 330/4.3
[51] Int. Cl............................................ H01s 3/09
[58] Field of Search.................... 331/94.5; 330/4.3

[56] References Cited
UNITED STATES PATENTS
3,553,603  1/1971  Leonard............................ 331/94.5
3,571,745  3/1971  Altman et al..................... 331/94.5
3,571,746  3/1971  Altman et al..................... 331/94.5

OTHER PUBLICATIONS

Shipman, Jr., Traveling Wave Excitation of High Power Gas Lasers, Appl. Phys. Let., Vol. 10, No. 1 (Jan 1, 1967) pp. 3 and 4

*Primary Examiner*—William L. Sikes
*Attorney*—Nichol M. Sandoe et al.

[57] ABSTRACT

A pulsed gas laser device comprises an energy storer in the form of at least one strip conductor having high voltage carrying surfaces, and a pair of opposed parallel electrodes electrically connected to said surfaces and spaced apart to form a discharge chamber. Portion of the strip conductors extend outwardly from one of said electrodes in the shape of a triangle one leg of which is formed by the electrode. A spark gap is located at the corner of the triangle most remote from the discharge chamber.

7 Claims, 3 Drawing Figures

ENERGY STORER AND DISCHARGE CHAMBER FOR A GAS LASER DEVICE

The invention relates to a pulsed gas laser device in which two parallel electrodes arranged opposite each other, and extending in the direction of radiation of the stimulated emission, form sides of a discharge chamber. Each of the electrodes is connected with the high-voltage-carrying surface of a strip-conductor energy storer mounted on the other sides of the discharge chamber. The excitation of the stimulated emission is effected by electric discharges which advance in the direction of radiation.

Gas lasers have the advantage over solid lasers that no dispersion losses need be expected in a gas column used as the amplifying medium since a gas column is much more homogeneous than a crystal, which always has stresses, striae or inclusions. The pumping mechanism which is based on a high-frequency or direct current gas discharge is also relatively simple as compared with that of a solid body. Gas bodies are inferior to the solid body only with respect to output power and amplification since the density of active atoms is smaller by about a factor of $10^5$. Efforts in the field of gas laser research have therefore been directed at increasing the output power while retaining a small construction.

Pulsed gas laser devices are known which have an energy storer consisting of a simple strip conductor and a plurality of spark gaps for the initiation of the discharge which are excited one after the other by dielectric switches and produce an excitation wave in the discharge chamber by progressive electric discharges. This known gas laser device has the disadvantage of a relatively high impedance, a complicated construction and the use of a large number of dielectric switches which are destroyed upon a single discharge. Another disadvantage is that due to the unavoidable deviations in time of the individual spark gaps from the desired switching sequence, the shape of the discharge pulse is impaired.

The object of the present invention is to increase output power and to make repeated operation possible while retaining a simplified construction of the device and a smaller impedance of its energy storer.

According to the invention, this objective is achieved by arranging that a portion of the energy storer extends outwardly from one side of the discharge chamber. This portion serves as a pulse former and has the shape of a triangle, one leg of which is formed by the discharge chamber. A spark gap serving for the introduction of the discharge is located at the corner of the triangle which is most remote from the discharge chamber. The triangular shape of the energy storer is particularly advantageous for the reason that as a result, an electric discharge advancing in the direction of radiation of the laser can be produced with only a single spark gap. It makes possible the impedance transformation of the relatively high resistance of the spark gap to the relatively low resistance of the discharge plasma.

In one advantageous embodiment, the energy storer consists of two strip conductors extending parallel to each other, the outer surfaces of which lie at ground potential.

The electrodes of the discharge chamber are developed in one suitable example to include rails extending in the direction of radiation. The development of the electrodes is, however, not limited to rails. Other suitable shapes of electrodes, such as needles, can also be used.

The members which form the discharge chamber are preferably made from plastic materials of high resistance to voltage and temperature, and are so shaped that the pressure for obtaining an optimum discharge plasma is variable between $10^{-3}$ mm Hg and a few atmospheres gauge.

For a short rise time of the discharge pulse, it is advantageous for the spark gap to be arranged between the strip conductors of the triangular pulse former part of the strip conductor.

In order to obtain a very rapid short-circuiting and for repetitive operation, the spark gap is preferably triggerable.

The propagating of the short-circuit is favored by the nature of the strip conductors each of which consists of an insulating layer having a thin conductive coating applied to the surfaces thereof.

For a compact construction, it is advantageous for the strip conductors to be bent out of the plane of the discharge electrodes.

In order to use a backward-moving laser emission, the rearward exit window of the discharge chamber is preferably mirrored.

A particular advantage of the invention is that the output power is substantially increased over that of known gas lasers while maintaining a simplified construction. By the foil construction of the strip conductors, the three-dimensional shape of the laser can be freely selected within wide limits. The invention is particullarly advantageous for gas lasers which are operated with nitrogen since it makes it possible to produce very short pulses.

Thus, for instance, with a 90-cm long, nitrogen-filled discharge chamber mirrored on one side, an output power of at least 5.5 MW with a wavelength of 337.1 nm is produced with a pressure of 30–70 mm Hg and an applied voltage of 20 KV. With a 30-cm long air-filled discharge chamber mirrored on one side, an output power of 1 MW is produced at the same pressure and the same voltage.

One embodiment of the invention is shown by way of illustration and will be described in further detail below. In the drawings.

Figure 1:
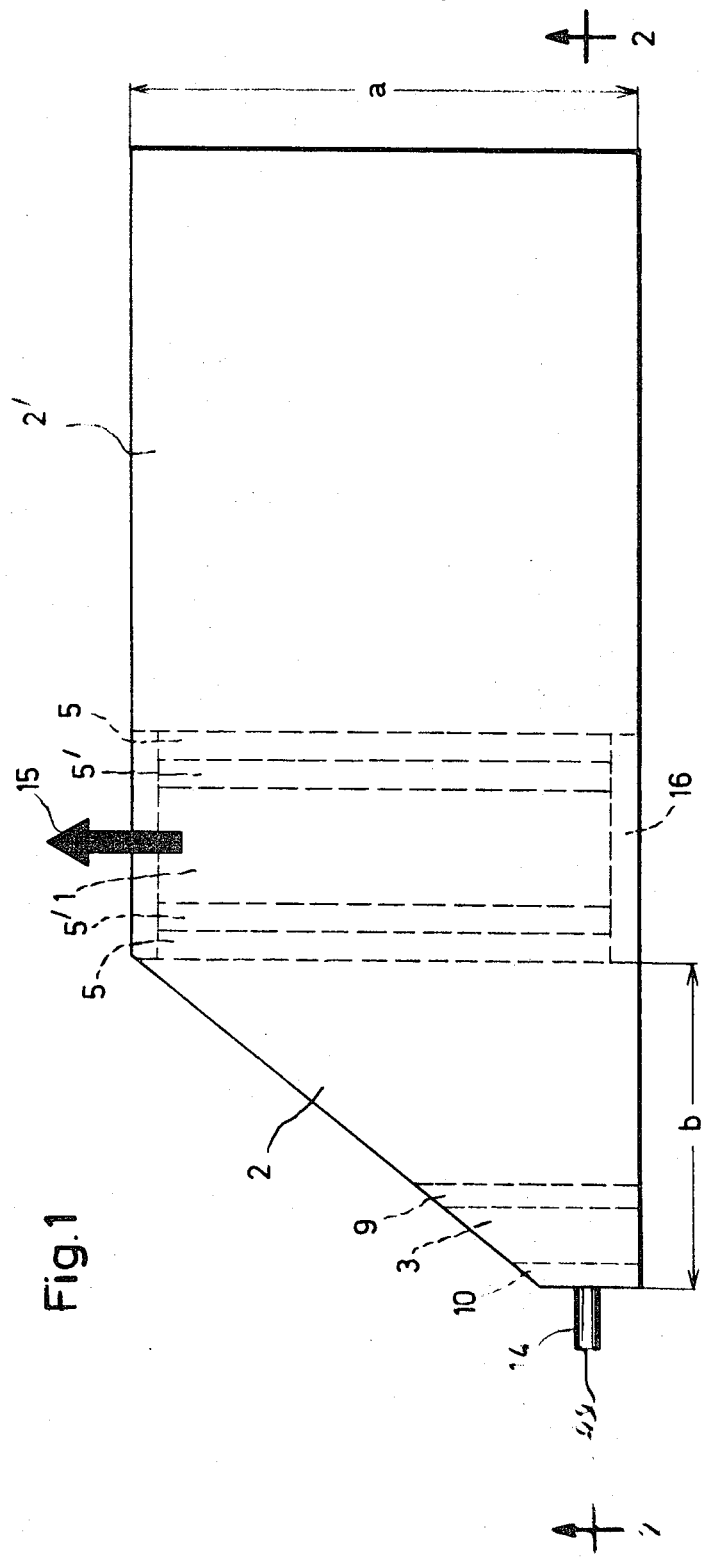
FIG. 1 is a plan view of the gas laser of the invention.

In the drawings, 1 is the discharge chamber, 2 and 2' constitute an energy storing system consisting of two spaced strip conductors extending parallel to each other, and 3 is the spark gap. A rectangular discharge chamber 1 is formed between said strip conductors comprising spaced upper and lower parallel insulating members 4 made of plastic materials which are resistant to high voltage and to temperature. The sides of the chamber comprise two spaced parallel electrodes 5 which are sealed off in vacuum-tight manner from the outside. Rails 5' mounted on the electrodes 5 extend through the discharge chamber throughout its entire length in the direction of radiation as indicated by arrow 15. The rear exit of the discharge chamber is preferably provided with a mirrored window 16. The gas which is to be excited for laser emission can be pumped through the discharge chamber either longitudinally or transversely through openings, not shown. Each of the strip conductors comprises conductive surfaces 6 and 7 which are applied in the form of thin coatings on an insulating layer 8. In the two strip conductor system used, the impedance is reduced to one-half and the capacitance doubled, as compared with the single strip conductors used in known gas lasers. The conductive coatings 7 applied to the inside of the system are galvanically connected with each other and can be charged to a variable high voltage with respect to the outer coatings 6 which are separated by the dielectric 8 and lie at ground potential. The spark gap 3 lies between spaced parallel metal electrodes 9 and 10 of large area. The electrode 9 is so connected with the two inner conductive surfaces 7 lying at high potential, and the electrode 10 is so connected with the outer conductive surfaces 6 lying at ground potential that an overall system of very low induction results. Between the two electrodes 9 and 10 are mounted shaped parts 11 and 12 which act as insulators. In the electrode 10 which is at ground potential there is also mounted a trigger electrode 13 which is insulated from the main electrode 10 by a ceramic tube 14 which can withstand particularly strong mechanical and electrical loads.

Figure 2:
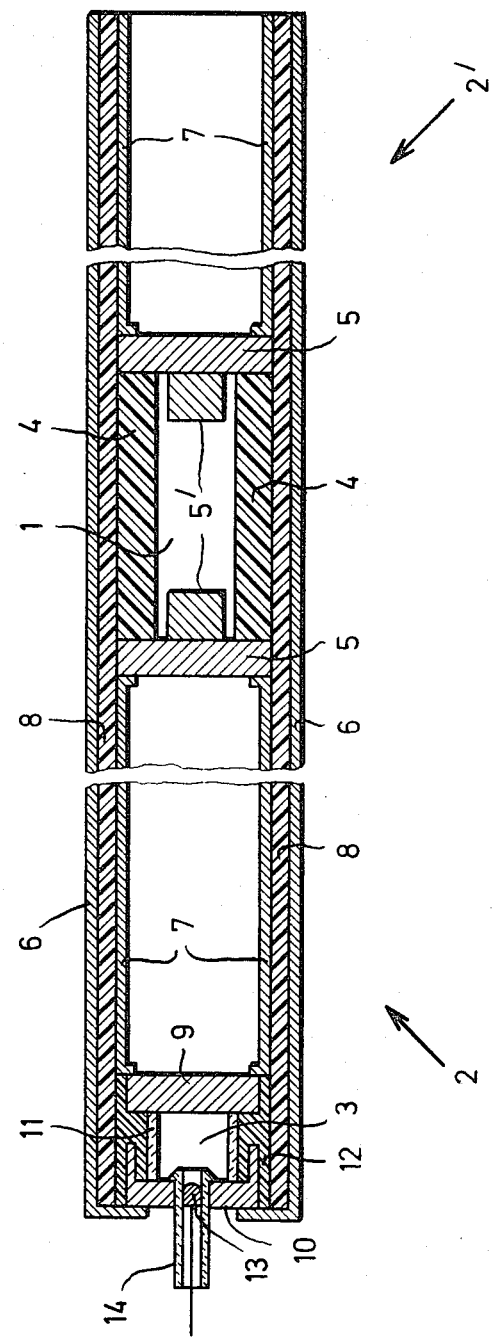
FIG. 2 is a section through a gas laser of the invention on the line 2—2 of FIG. 1.
Figure 3:
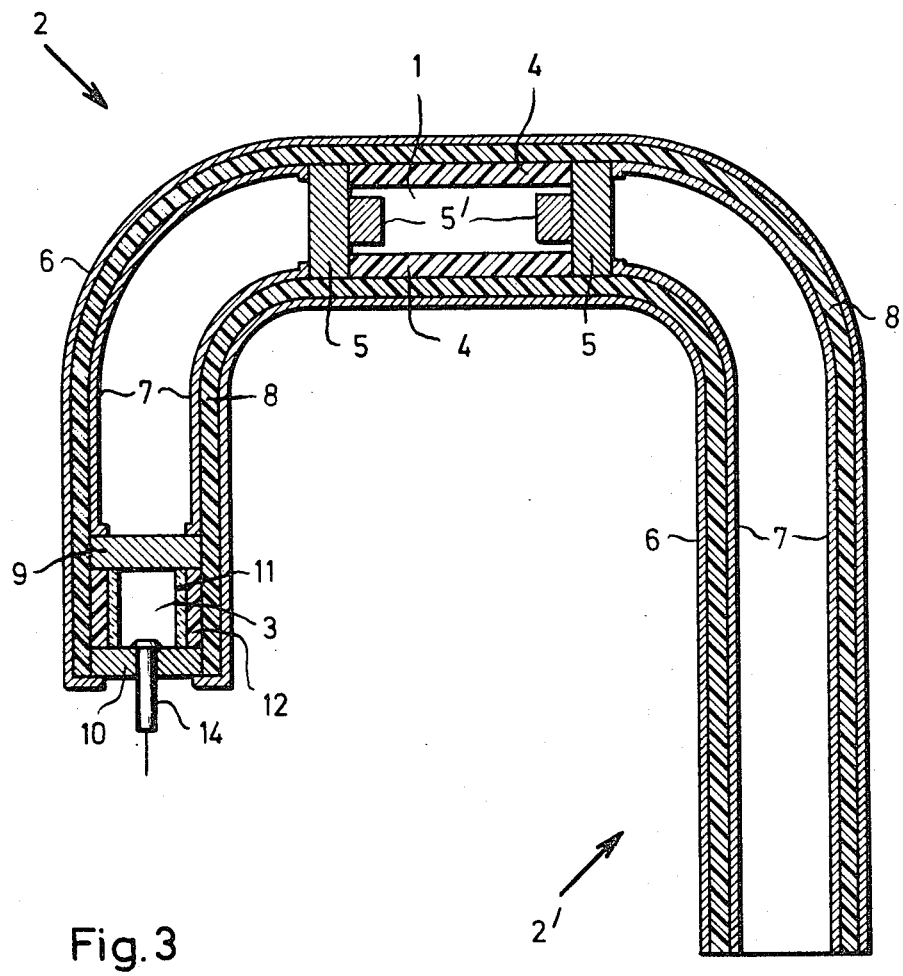
FIG. 3 is a section through a gas laser in which the strip conductors are bent out of the plane of the discharge electrodes.

The part 2 of the strip conductor system shown to the left of the discharge chamber in FIGS. 1 and 2 is developed in accordance with the invention in the form of a right triangle. The dimensions result from the requirement of producing an excitation wave in the discharge chamber. In the embodiment shown in the drawing the legs a and b have a length of 0.9 and 0.6m, respectively. After the triggering of the spark gap 3 there is produced a very rapid short-circuit between the coatings 6 and 7 which propagates itself circularly. Due to the triangular shape of the part 2 of the energy storer 2, 2' arranged between the spark gap 3 and discharge chamber 1, this short-circuit first reaches the discharge chamber at the near end. There the first breakdown takes place between the two rails 5'. This breakdown then moves, in case of suitable embodiment of the pulse former part, with the speed of light in the direction of radiation 15 to the other end of the discharge chamber. As a result of this, upon the passage of the photons released at one end of the discharge chamber 1, a phase-coupled amplification occurs. The stream of photons which moves in the opposite direction is amplified over only a small portion of the path. The ratio of the laser power emitted in the direction of propagation of the short-circuit is about 11:1 in the example described.

We claim as our invention:

1. A gas laser device comprising an energy storer formed of two spaced parallel strip conductors each having high voltage carrying surfaces, two opposed parallel electrodes located between said strip conductors and spaced apart to form a discharge chamber therebetween, said high-voltage carrying surfaces being electrically connected to said electrodes, said strip conductors having portions extending outwardly from one of said electrodes in the shape of a triangle, one leg of which is formed by said electrode, and a spark gap located between said strip conductors at the corner of the triangle most remote from said discharge chamber.

2. A gas laser device according to claim 1 including rails mounted on said electrodes and extending through said discharge chamber.

3. A gas laser device according to claim 1 in which said spark gap comprises two spaced electrodes one of which is electrically connected to said high voltage carrying surfaces, and the other of which is at ground potential.

4. A gas laser device according to claim 3 including a trigger electrode mounted in said electrode which is at ground potential and insulated therefrom.

5. A gas laser device according to claim 1 in which each of said strip conductors comprises a layer of insulating material to the surfaces of which thin conductive coatings are applied.

6. A gas laser device according to claim 1 in which said strip conductors are bent out of the plane of the electrodes which form said discharge chamber.

7. A gas laser device according to claim 1 in which the discharge chamber includes a rear exit window which is mirrored.

* * * * *